US009596583B2

United States Patent
Dunn et al.

(10) Patent No.: US 9,596,583 B2
(45) Date of Patent: Mar. 14, 2017

(54) LOCAL NETWORK ALERT SYSTEM FOR MOBILE DEVICES USING AN IMS SESSION AND WI-FI ACCESS POINT

(71) Applicant: T-Mobile USA, Inc., Bellevue, WA (US)

(72) Inventors: Timothy N. Dunn, Issaquah, WA (US); Michael Hooker, Bellevue, WA (US); Shelby Seward, Bellevue, WA (US); Srini Bodapotula, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/050,331

(22) Filed: Feb. 22, 2016

(65) Prior Publication Data

US 2016/0174054 A1 Jun. 16, 2016

Related U.S. Application Data

(63) Continuation of application No. 13/912,127, filed on Jun. 6, 2013, now Pat. No. 9,271,135.

(51) Int. Cl.
*H04W 4/22* (2009.01)
*H04W 4/14* (2009.01)
(Continued)

(52) U.S. Cl.
CPC ............ *H04W 4/22* (2013.01); *H04L 65/103* (2013.01); *H04L 65/1016* (2013.01);
(Continued)

(58) Field of Classification Search
CPC ......... H04W 4/22; H04W 4/14; H04W 84/12; H04W 4/02; H04W 4/12; H04L 65/1073; H04L 65/103; H04L 65/1016
See application file for complete search history.

(56) References Cited

U.S. PATENT DOCUMENTS 5,124,693 A 6/1992 Himelstein et al.
8,364,746 B2 1/2013 Annamalai et al.
(Continued)

FOREIGN PATENT DOCUMENTS

WO 2007121331 10/2007
WO 2008049131 4/2008
(Continued)

OTHER PUBLICATIONS

Bourke, Paul, "Determining if a point lies on the interior of a polygon," Nov. 1987, 6 pages. <bbs.dartmouth.edu/~fangq/MATH/download/source/Determining> accessed on Jun. 5, 2014.

*Primary Examiner* — Brandon Miller
(74) *Attorney, Agent, or Firm* — Perkins Coie LLP

(57) ABSTRACT

A wireless emergency alert system (also known as a wireless emergency alert system, or "WEA," and formerly known as a commercial mobile alert system, or "CMAS") receives a geotargeted federal alert that is to be delivered to mobile devices within a defined geographic region. A database of locations of access points is utilized by the system to identify those access points that are likely present in the defined region. The system identifies mobile devices that have an ongoing connection (e.g. IP multimedia subsystem (IMS) session) with the identified access points, in part by maintaining and accessing a look-up table containing location information for the access point and connected mobile devices. In addition, the system tracks mobile devices that no longer have an ongoing session and deregisters the appropriate mobile devices in the look-up table. For mobile devices that have an ongoing session, the system delivers the received alert to the mobile devices in the targeted region via the identified access points.

20 Claims, 5 Drawing Sheets

Related U.S. Application Data

(60) Provisional application No. 61/801,200, filed on Mar. 15, 2013.

(51) Int. Cl.
| | |
|---|---|
| *H04L 29/06* | (2006.01) |
| *H04W 4/02* | (2009.01) |
| *H04W 4/12* | (2009.01) |
| *H04W 84/12* | (2009.01) |

(52) U.S. Cl.
CPC ........... *H04L 65/1073* (2013.01); *H04W 4/02* (2013.01); *H04W 4/12* (2013.01); *H04W 4/14* (2013.01); *H04W 84/12* (2013.01)

(56) References Cited

U.S. PATENT DOCUMENTS

| | | |
|---|---|---|
| 8,537,797 B2 | 9/2013 | Narkar et al. |
| 9,271,135 B2 * | 2/2016 | Dunn ...................... H04W 4/22 |
| 2009/0247111 A1 * | 10/2009 | Sennett ............... H04W 76/007 |
| | | 455/404.1 |
| 2009/0291630 A1 | 11/2009 | Dunn et al. |
| 2011/0103302 A1 | 5/2011 | Hall et al. |
| 2012/0276864 A1 | 11/2012 | Sennett et al. |
| 2013/0012154 A1 * | 1/2013 | Ramos ................... H04L 51/20 |
| | | 455/404.2 |
| 2014/0273910 A1 * | 9/2014 | Ballantyne .............. H04W 4/22 |
| | | 455/404.1 |

FOREIGN PATENT DOCUMENTS

| | | |
|---|---|---|
| WO | 2008049132 | 4/2008 |
| WO | 2008051929 | 5/2008 |

* cited by examiner

| ACCESS POINT ID | LOCATION INFORMATION | SESSION STATE | DEVICE IDENTIFIER | ALERT MESSAGE 226 Message ID | ALERT MESSAGE 227 Message Sent? | ALERT MESSAGE 228 Confirmation Received? |
|---|---|---|---|---|---|---|
| 00-B0-D0-86-BB-F7 | GPS: +48.644060, -84.001636 | Active | IMEI: 54878546321545 | D5546 | Y | N |
| | | | | BBTGD | Y | N |
| | | | | 47 | Y | Y |
| 214.37.47.227 | FIPS: 13029 | Active | IMEI: 58874544518936 | D5546 | N | N |
| | | | | BBTGD | Y | Y |
| | | | | 47 | N | N |
| 214.37.47.227 | FIPS: 13029 | Active | SN: GGFUHDS | D5546 | Y | N |
| | | | | BBTGD | Y | Y |
| | | | | 47 | N | N |
| 4 | ZIP: 10027 | Inactive | MSISDN: +380565552134027 | D5546 | Y | Y |
| | | | | BBTGD | N | N |
| | | | | 47 | Y | N |
| 218.34.47.227 | GPS: +18.114878, -77.654844 | Active | MSISDN: +382655521870557 | D5546 | Y | N |
| | | | | BBTGD | Y | N |
| | | | | 47 | N | N |
| 218.39.97.208 | GPS: +18.114878, -77.654844 | Active | URI: name@t-mobile.com | D5546 | N | N |
| | | | | BBTGD | Y | Y |
| | | | | 47 | N | Y |
| 240.09.14.337 | GPS: +18.114878, -77.654844 | Inactive | IMSI: 552451254136978 | D5546 | Y | Y |
| | | | | BBTGD | Y | Y |
| | | | | 47 | Y | N |

*FIG. 2*

LOCAL NETWORK ALERT SYSTEM FOR MOBILE DEVICES USING AN IMS SESSION AND WI-FI ACCESS POINT

CROSS-REFERENCE TO RELATED APPLICATION

This application is a continuation of U.S. patent application Ser. No. 13/912,127 filed Jun. 6, 2013, entitled "LOCAL NETWORK ALERT SYSTEM FOR MOBILE DEVICES USING AN IMS SESSION AND WI-FI ACCESS POINT", now U.S. Pat. No. 9,271,135, which claims the benefit of U.S. Provisional Application No. 61/801,200, entitled "LOCAL NETWORK ALERT SYSTEM FOR MOBILE DEVICES USING AN IMS SESSION AND WI-FI ACCESS POINT," filed Mar. 15, 2013.

BACKGROUND

Mobile devices, such as wireless and cordless phones, handheld computers, smartphones, and media players, among others, have become ubiquitous. Most mobile devices, if not all, have messaging capabilities, such as text messaging via SMS (Short Message Service) and multimedia messaging via MMS (Multimedia Message Service). SMS and MMS have become popular modes of transmitting information to mobile device users. In addition, some fixed devices now share mobile device platforms and services. In particular, Unlicensed Mobile Access (UMA) devices, which may be fixed and replicate traditional "landline" operate on both cellular and IP-based networks.

In an emergency situation, such as a terror attack or a natural disaster (e.g., hurricane, tornado, and earthquake), it may be desirable to alert members of the public located in the particular area of the emergency such that they may have sufficient warning or receive instructions for responding to the emergency. Alternatively, it may be desirable to alert members of the public within a specific geographical area of a commercial offering that is available at a nearby retail location.

Current systems are designed to send alert messages to mobile users by identifying traditional cellular base stations that are located in a target area for a given alert. The alert is sent to each cellular base station in the target area, each base station then forwards the alert to each mobile phone that is connected to the respective base station. However, these traditional alert systems do not offer the ability to reach mobile devices that use a WiFi access point (rather than a traditional base station) to connect to a telecommunications network such as an IP for Multimedia Subsystem (IMS) network. Therefore, a need exists for an alert system that tracks the physical location of WiFi access points and forwards alert messages to devices (such as mobile devices or other IMS-enabled devices) that are connected to the WiFi access points that are situated in a target region. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 2 illustrates a look-up table 200 that operates in accordance with the embodiments disclosed herein.

DETAILED DESCRIPTION

A wireless emergency alert system ("WEA," and formerly known as a commercial mobile alert system, or "CMAS") receives a geotargeted federal alert that is to be delivered to mobile devices within a defined geographic region. A database of locations of WiFi access points is utilized by the system to identify those access points that are likely present in the defined region. The system identifies mobile devices that have an ongoing IP multimedia subsystem (IMS) session with the identified WiFi access points, in part by maintaining and accessing a look-up table containing location information for the WiFi access point and connected mobile devices. In addition, the system tracks mobile devices that no longer have an ongoing IMS session and deregisters the appropriate mobile devices in the look-up table. For mobile devices that have an ongoing IMS session, the system delivers the received alert to the mobile devices in the targeted region via the identified Wi-Fi access points.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention incorporates many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overly and specifically defined as such in this Detailed Description section.

System Description

Figure 1A:
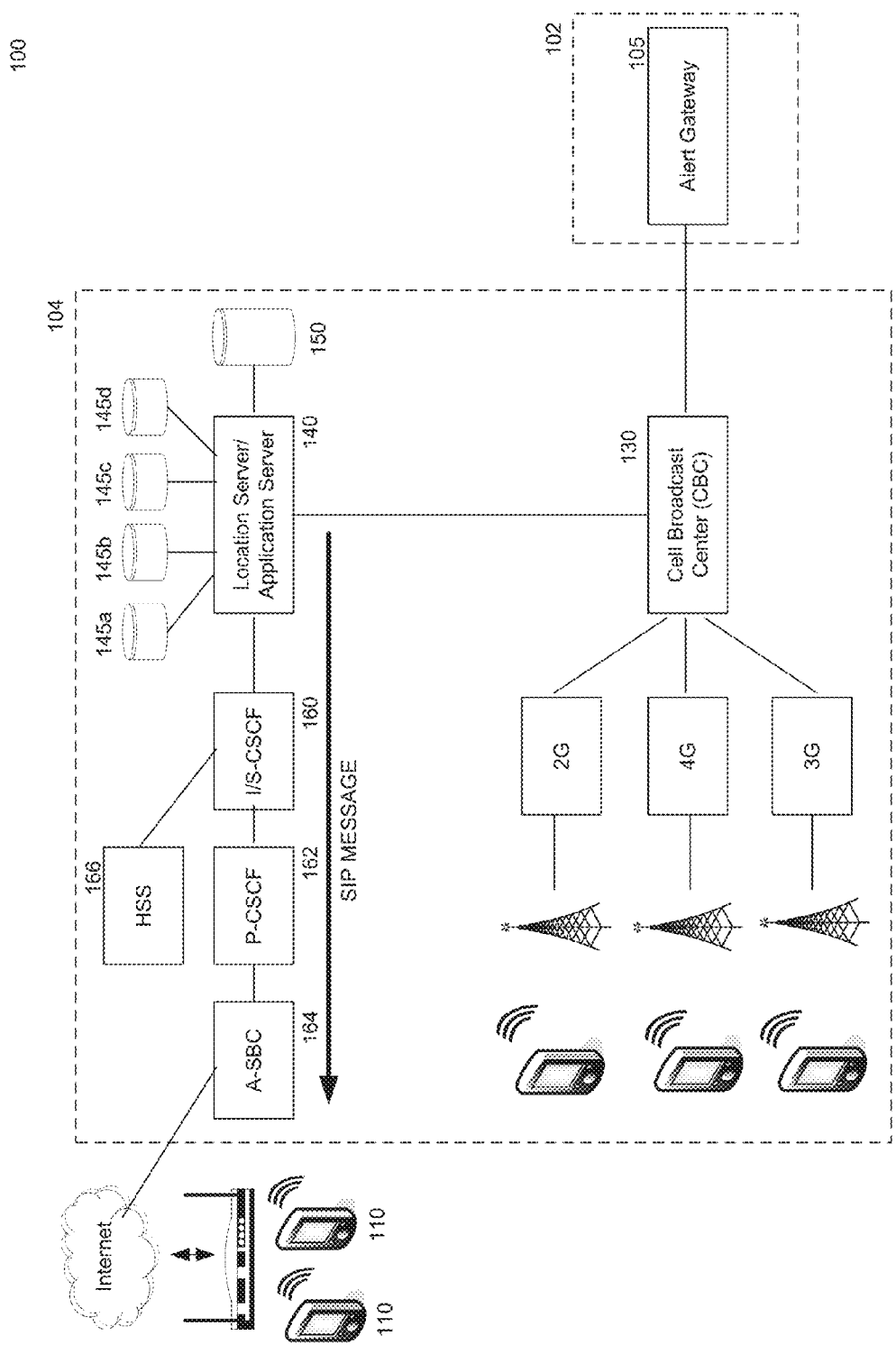
FIGS. 1A and 1B show a system level schematic illustration of an alert system operable to implement aspects of the invention. Hereinafter, FIGS. 1A and 1B will collectively be referred to as FIG. 1.
Figure 1B:
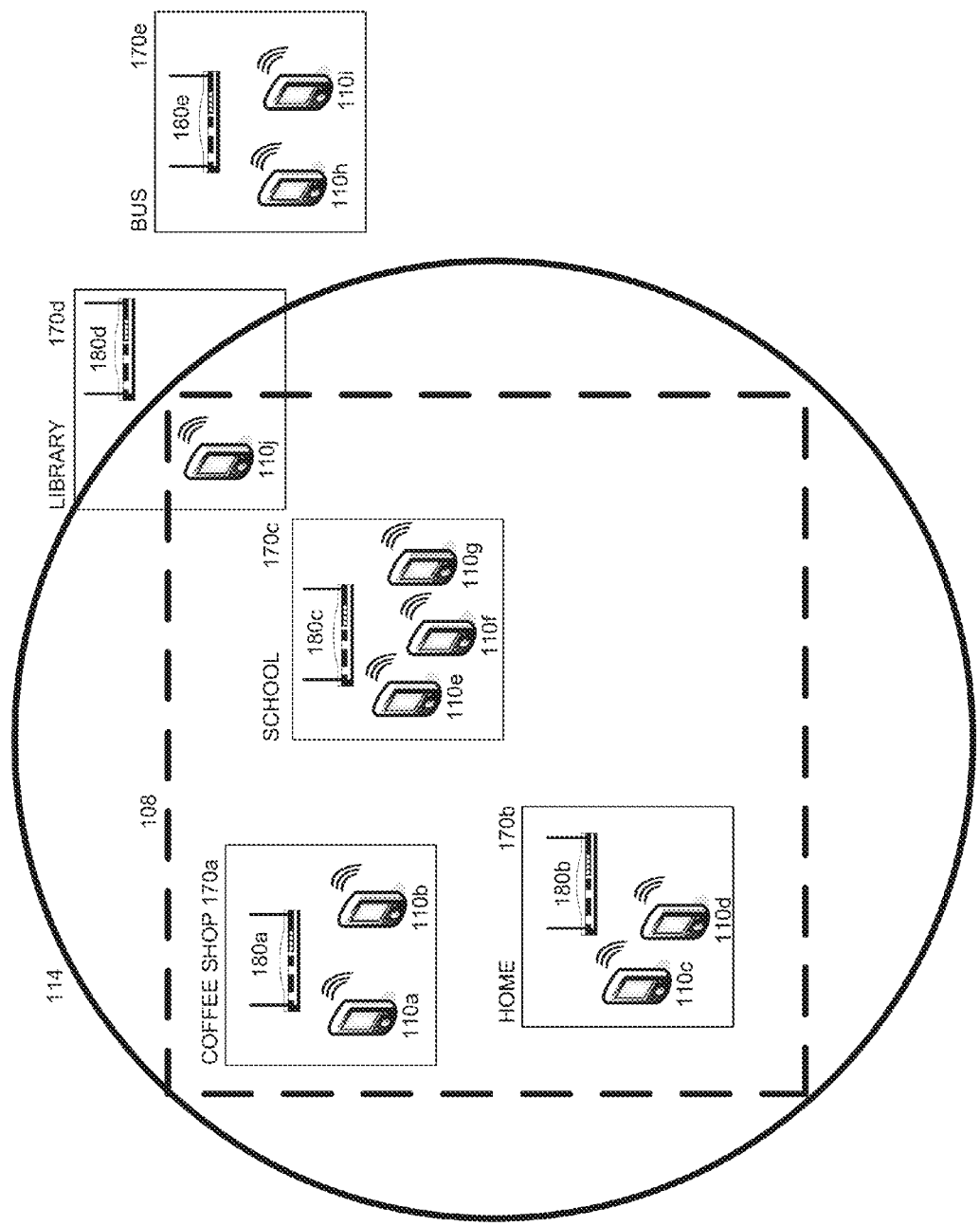

FIG. 1 shows a system level schematic illustration of an alert system 100, for example a Wireless Emergency Alert System (WEA). The alert system 100 comprises an alerting network 102 (including an alert gateway 105) coupled to a broadcasting network 104 operable to transmit targeted alerts to one or more mobile devices 110 located within a WiFi coverage area 170. The one or more mobile devices 110 may be coupled to the broadcasting network 104 through an access point 180, such as a wireless router. The alerting network 102 is operable to send an alert message from alert gateway 105 to the broadcasting network 104 for transmission to one or more mobile devices 110 positioned in a specific geographic target area 108, such as a FIPS code, ZIP code, Census Code, or other region, as described in more detail below. Alert gateway 105 transmits alert messages issued by an agency such as a federal government. For example, under WEA, alert gateway 105 may transmit alerts issued by the President of the United States, alerts involving imminent threats to safety or life, and/or AMBER alerts. The mobile devices 110 may be any of a variety of mobile devices, such as wireless phones, Unlicensed Mobile Access or UMA-enabled devices (also known as Generic Access Network (GAN) devices), handheld computers, smartphones, media players, and the like that are enabled for use within at least the target area 108. In addition to specifying one or more target areas, an alert message may also include various instructions for responding to an emergency. For example, an alert message may warn residents of an approaching tornado or hurricane and direct residents to available storm shelters.

Target area 108 may include one or more IP-based networks, particularly WiFi networks (or "hotspots") featuring a WiFi access point such as a wireless router for sending and receiving data over unlicensed spectrum. A WiFi network allows multiple WiFi enabled devices, such as mobile phones and personal computers, to communicate over various public or private communications networks, such as the Internet. A WiFi access point within a WiFi network typically provides Internet access to multiple user devices within a limited geographic area. For example, FIG. 1 includes WiFi access point 180a which resides within the WiFi network and provides Internet access to multiple users located inside of a coffee shop. Similarly, access point 180b resides the within WiFi network 170b and provides Internet access to multiple users within a residential home, access point 180c resides within the WiFi network 170c and provides Internet access to multiple users within a school building, access point 180d resides within the WiFi network 170c and provides Internet access to multiple users within a school building, and access point 180e resides within the WiFi network 170e and provides Internet access to multiple user located on a bus.

The alerting network 102 may send a target area signal to broadcasting network 104, the target signal including geographic location information corresponding to target area 108. Alternatively, the alert gateway 105 may embed the geographic location information in the alert message. The geographic location information may include place name information such as, for example, Potomac River Valley or the like. In other embodiments, the geographic location information may take the form of a FIPS code, ZIP code, or GPS coordinates. Federal Information Processing Standards (FIPS) codes, like Census Codes, are used by the U.S. government to standardize the identification of different entities, such as states and counties. These codes are issued by the National Institute of Standards and Technology. For example, each county in the United States is assigned a FIPS code. ZIP codes on the other hand designate quadrants or locations within a county. The broadcasting network 104 determines one or more access point identifiers (e.g., an IP address or MAC address) associated with one or more access points located at least partially within target area 108.

The broadcasting network 104 may calculate a shape (e.g., a polygon) from the geographic location information (e.g., FIPS, ZIP, or GPS coordinates) included in the target area signal (or alert message) that represents the target area 108. In some embodiments, the geographic location information may already be in the form of a shape (e.g., a 5-mile radius with a center at a defined coordinate, or a polygon) that represents the target area 108. The broadcasting network 104 determines an adjusted target area 114 that substantially estimates the target area 108. In other words, the adjusted target area 114 may enclose or overlay the target area 108. The broadcasting network 104 may then determine the mobile devices that are connected to the access points 180a (coffee shop), 180b (home), 180c (school), and/or 180d (library) and forward the alert message to only those mobile devices without substantially broadcasting the alert message to mobile devices connected to access point 180e (bus), which lies outside of the adjusted target area 114. In the example of FIG. 1, the alert message would be transmitted to mobile devices 110a and 110b (connected to access point 180a), mobile devices 110c and 110d (connected to access point 180b), and mobile devices 110e, 110f, and 110g (connected to access point 180c). Further, in the example of FIG. 1, the alert message would not be transmitted to mobile devices 110h and 110i (connected to access point 180e).

An alert message may be in a variety of formats, including the Common Alerting Protocol (CAP) format. The CAP is an XML-based data format for exchanging public warnings and emergencies between alerting technologies. CAP allows a warning message to be consistently disseminated simultaneously over many warning systems to many applications. The alert gateway 105 may receive an alert message (e.g., alert message in CAP format) from the alerting network 102 and convert the alert message into a format supported by the broadcasting network 104 (e.g., a text profile base Commercial Mobile Alert Message (CMAM) format). The alert gateway 105 sends the converted alert message, hereinafter CMAM, to the broadcasting network 104.

The broadcasting network 104 comprises multiple components common to IMS networks. The broadcasting network includes a location/application server 140 and location information databases 145a-145d. Additionally, the broadcasting network 104 includes a look-up table database 150 operable to track access points serving mobile devices registered to the IMS network, as described in more detail below. The location information databases contain various types of information that the location/application server 140 may use to determine the location (such as GPS coordinates) of one or more access points 180 that are connected to the broadcasting network 104. For example, database 145a may contain MAC address information, database 145b may contain GSM WCDMA information, database 145c may contain customer address information, and/or database 145d may contain public IP information. The CBC 130 receives the CMAM from the alert gateway 105. The CMAM may include the geographic location information of the target area 108 embedded in the CMAM. Alternatively, according to one embodiment, the CBC 130 may receive the target area signal from the alerting network 102, wherein the target area signal provides the geographic location information of the target area 108. In such embodiment, the target area signal is sent in addition to the CMAM (i.e., alert message). This target area signal having the geographic location information may also be converted into text profile based CMAM format. The CBC 130 may run a validation test on the CMAM and send an error response to the alerting network 102 if the CMAM fails validation. Such may result in the CMAM not being broadcast.

The location/application server 140 receives the geographic location information of the target area 108 from the CBC 130. Although FIG. 1 illustrates the location/application server 140 as a separate component from the CBC 130, in some embodiments the location/application server 140 may be embedded within the CBC 130, such as operating on the same server. The geographic location information may, for example, be in the form of FIPS, ZIP, GPS coordinates, or a defined shape. If the geographic location information is received in the form of FIPS, ZIP, or GPS coordinates, the location/application server 140 transforms the geographic location information into the shape (e.g., a polygon) representing the target area 108. Otherwise, the geographic location information received from the CBC 130 is already in a form of the shape representative of the target area 108. The transformation into the representative shape (e.g., a polygon) of the target area 108 may occur in real-time or near real-time to provide a more accurate alert and respond to changes that may occur periodically, such as daily changes or hourly changes. For example, daily changes may be in the form of changes in the boundaries of the target area 108 in response to changes in the emergency conditions. For example, path changes of a hurricane or twister, wind shifts during forest fires, or updated intelligence on an imminent terror attack may reflect a change in the boundaries of the target area 108. In some embodiments, the alerting network 102 provides the CBC 130 with external data, e.g., meteorological data and/or updated intelligence data, to show changes in hurricane or twister path or other natural disaster, and/or changes to a potential terror area. The external data can be used by components of the broadcasting network 104 to alter the boundaries of the target area 108 in real-time. In some embodiments, the alerting network 102 provides the CBC 130 with a link to external data such as an Internet Web site to retrieve information (e.g., location, threat nature, threat severity, threat duration, etc.) regarding an alert message.

The location/application server 140 has access to one or more databases 145a-145d and 150 including identification, location, and/or geographic coverage information for access points 180a-180e and/or areas served by access points 180a-180e. Although FIG. 1 illustrates the database(s) 145a-145d and 150 as separate from, but directly connected with, location/application server 140, in some embodiments one or more of the databases may be distributed anywhere in the broadcasting network 104. For example, location/application server 140 may be capable of accessing databases 145a-145d and 150, which may store IP addresses, MAC addresses or other identifiers for access points 180a-180c that are included in the target area 108.

In an embodiment, the location/application server 140 implements a point-in-polygon search to determine the identifiers (e.g., IP addresses, MAC addresses and other relevant identifiers) for access points 180a-180c that are situated within the target area 108. For example, this can be done by determining the latitude and longitude extent of the target area 108 (e.g., a polygon), identifying those access points 180a-180c that are situated within the target area 108, and obtaining the identifiers associated with such access points 180a-180c. Alternatively or additionally, the location/application server 140 may determine the latitude and longitude extent of the target area 108 (e.g., a polygon), determine whether all or any portion of the access points 180a-180c (e.g., using point-in-polygon search) extend into an area outside the target area 108, and obtain identifiers associated with those access points 180a-180c. Details on techniques for implementing the point-in-polygon search may, for example, be found in an article by Bourke, Paul, entitled "Determining If A Point Lies On The Interior Of A Polygon," November 1987, and in U.S. Pat. No. 5,124,693. The polygon-in-polygon search technique may, for example, be found in U.S. Pat. No. 5,124,693.

The obtained access point information may include, in addition to relevant identifiers, location coordinates such as coverage areas of the provided WiFi service, and/or the latitude and longitude of the access points 180a-180c, similar to the CGI information provided for 911 services in a location center. The location/application server 140 may forward a list of the determined identifiers (e.g., IP addresses, MAC addresses and/or other identifiers) to the CBC 130.

Alternatively or additionally, the location/application server 140 may determine the adjusted target area (e.g., a rectangle, square, or circle) 114 that substantially estimates the representative shape of the target area 108 using one of any known best-fit algorithms. For example, the location/application server 140 may define a center of the target area 108 and a radius defining the adjusted target area 114 (i.e., a circle) that forms a best-fit circle encircling or just within the target area 108. Alternatively, the adjusted target area 114 may be a "best-fit" rectangle that fits around or within the boundary of the target area 108. Some best-fit algorithms may include a determination of first and second best-fit areas, and if the first best-fit area minus the target area 108 is greater than the second best-fit area minus the target area 108, the algorithm selects the second best-fit area as the adjusted target area 114. Although FIG. 1 shows a rectangular target area 108 inside of a circular adjusted target area 114, a person of ordinary skill in the art will recognize that a circular target area may lie inside of a rectangular adjusted target area.

The location/application server 140 may calculate location coordinates (e.g., latitude and longitude) of opposite corners of the adjusted target area 114. Alternatively, the location/application server 140 may calculate a location coordinate of the center of the adjusted target area 114 and the radius, which define the adjusted target area 114. Although reference will herein be made to the opposite corners defining the adjusted target area 114, it will be understood by those skilled in the art that defining the adjusted target area 114 by determining various other coordinates such as the center coordinate and the associated radius is also within the scope of aspects of the invention. The location coordinates of the opposite corners may be forwarded to the CBC 130 for validation. The location/application server 140 then, or coincidentally with the calculation of the adjusted target area 114, obtains identifiers as described above. Further details regarding defining the boundary are provided below, e.g. with reference to FIG. 4.

Alternatively or additionally, the location/application server 140 may adjust the boundaries of the "best fit" adjusted target area to accommodate or ensure maximum broadcast coverage in the target area 108, using a "best coverage" algorithm. For example, a "best fit" adjusted target area 114 may include all access points 180a-180c within its borders, but may not capture all of the relevant coverage area within the adjusted target area 114 because some percentage of coverage within the adjusted target area 114 is provided by access point 180d located outside the adjusted target area 114. For example, an access point 180d may be located outside of the adjusted target area 114 but its associated coverage area may intersect with a portion of the adjusted target area 114 to provide service to mobile device 110j. In such a case, a "best coverage" algorithm may be executed to extend the outward borders of the adjusted target area 114 to ensure that the broadcast alert is broadcast to access point 180d to ensure maximum coverage of the adjusted target area 114. The location coordinates of the opposite corners of the adjusted target area 114 may be forwarded to the CBC 130 for validation.

Access point 180e, which is located outside of adjusted target area 114 and which does not overlap with adjusted target area 114, does not receive the broadcasted alert. Access point 180e is located on a moving bus. While access point 180e may not initially be located inside of the adjusted target area 114, the access point 180e may move into the adjusted target area 114 as the bus travels to a destination. In such cases, the location/application server may continually monitor the target area 108 and the adjusted target area 114. The location/application server then may update the stored location information accordingly to ensure that alerts are broadcast to all access points in a designated target area.

The access points 180a-180d are registered as part of the relevant network. Geographic location information associated with access points 180a-180d are known to the location/application server 140. For example, the location/application server 140 may have access to the database 150 containing a look-up table of registered access points and their associated location information, as described in more detail below. The location information can be geographic coordinates (e.g., latitude and longitude) of the access points used to route communications between the access point and the connected mobile devices. Alternatively, the location information can be the street address of the access point, which may be converted into latitude and longitude coordinates. For example, when an access point is initially registered with the network, the user may be required to input a street address for the location of the access point. The system may then obtain and store in a database the latitude and longitude coordinates for the access point. Details on techniques for locating access points may be found in PCT App. No. PCT/US07/82156, System And Method For Determining A Subscriber's Zone Information, Oct. 22, 2007, (31419-8034.WO00); PCT App. No. PCT/US07/82133, Two Stage Mobile Device Geographic Location Determination, Oct. 22, 2007, (31419-8035.WO00); PCT App. No. PCT/US07/82136, System And Method For Utilizing IP-Based Wireless Telecommunications Client Location Data, Oct. 22, 2007, (31419-8036.WO00); U.S. patent application Ser. No. 12/089,905, System And Method For Determining Device Location In An IP-Based Wireless Telecommunications Network, Apr. 10, 2008, (31419-8028.US01); and PCT App. No. PCT/US07/66579, Mobile Computing Device Geographic Location Determination, Apr. 12, 2007, (31419-8030.WO00).

The broadcast network 104 receives the CMAM (i.e., converted alert message) and the location coordinates of the opposite corners of the rectangular shape 108 from the CBC 130. The location/application server performs a lookup of the registered devices in the database 150 to identify those devices that are within the rectangular shape 108. In other words, the location/application serer compares the coordinates associated with the registered devices to the location coordinates of the opposite corners of the rectangular shape 108, to select those registered devices that are within the rectangular shape 108 for broadcasting. Based on such determination, the broadcast network 104 broadcasts the CMAM to the devices that are within the target area without substantially broadcasting the CMAM to devices located outside the target area.

FIG. 2 illustrates a look-up table 200 that operates in accordance with the embodiments disclosed herein. Look-up table 200 can be used to track the locations of access points and the locations of registered devices that connect to the IMS network through the access points. The lookup table may be stored in one or more databases in broadcast network 104. For example, the look-up table 200 may be stored in database 150, which is accessible by the location/application server 140. Although not shown, the database 150 also may be accessible via the CBC 130, thereby allowing the CBC 130 to access the contents of the look-up table 200. The look-up table 200 contains a variety of rows and columns to facilitate tracking the locations of access points and registered devices, as well as tracking the status of alert messages.

An "Access Point ID" column 205 contains an identification number for each access point that is connected to a registered device. As discussed above, the identification number for each access point may be an IP address, a MAC address, or any other identification number operable to distinguish one access point from other access points in the look-up table. A "Device Identifier" column 220 contains an identification number for each registered device (also referred to as a "user equipment identification" or "UE ID"). The identification number for a registered device may be any number that is operable to distinguish the device from other devices in the look-up table 200. For example, the Device Identifier may be an International Mobile Equipment Identity (IMEI) number, an International Mobile Subscriber Identity (IMSI), a serial number (SN), a Mobile Subscriber Integrated Services Digital Network-Number (MSISDN), or a Uniform Resource Identifier (URI). A "Location Information" column 210 contains the physical location of each access point that serves a registered device. As discussed above, the location information may be any information that provides a geographic location of the access point, including a FIPS code, a ZIP code, or GPS coordinates. A person of ordinary skill in the art will recognize that additional types of geographic location information may be included in the look-up table 210, including place names (e.g., Potomac River Valley), street addresses (e.g., 211 Main St.), street intersections (e.g., Main St. & 1st Ave.), or neighborhoods (e.g., Hell's Kitchen).

A "Session State" column 215 contains an indication of the registration status of each device that is currently in the look-up table 200, where the registration status reflects whether a respective device is currently registered on the IMS network (i.e., active session) or is not currently registered on the IMS network (i.e., inactive session). A device such as a mobile phone or smartphone may register with the IMS network using well-known registration procedures involving commonly understood IMS network components, including interrogating or serving call session control function (US-CSCF) 160, proxy call session control function (P-CSCF) 162, home subscriber server (HSS) 166, and access session border controller (A-SBC) 164. Further details on the IMS network components and registration procedures may be found in commonly-assigned U.S. patent application Ser. No. 12/856,519 Title ENHANCED REGISTRATION MESSAGES IN INTERNET PROTOCOL MULTIMEDIA SUBSYSTEMS, filing date 13 Aug. 2010, which is herein incorporated by reference in its entirety.

The IMS architecture typically does not provide for explicit deregistration of devices that are no longer operatively connected to the IMS network. For example, when a user enters a coffee shop 170a, the user's mobile phone 110b may register for IMS services through access point 180a. However, when the user leaves the coffee shop 170a and travels to an area that is not served by access point 180a or a different access point, the mobile phone 110b typically may not send a deregistration message to inform the IMS network that the mobile phone 110b is no longer within a range serviceable by the access point 180a. As a result, the IMS databases may lack an up-to-date listing that accurately reflects the connected devices. The present technology therefore enables the accurate gathering of information regarding the registration and deregistration of devices on the IMS network via the look-up table 200.

The system may obtain deregistration status in a variety of ways. In one embodiment, the system automatically deregisters a user device after a predetermined amount of time. For example, each time a device registers on the IMS network, the location/application server (or other component of the system) sets the "Session State" to a value (e.g., "Active," "communicating," or 'Y') that indicates an active registration status for the newly registered device. In addition, the location/application server (or other component of the system) may start a timer that expires after a predetermined amount of time. When the timer expires after the predetermined amount of time has elapsed, the location/application server automatically deregisters the user device from the IMS network and indicates a deregistered status by assigning an appropriate value (e.g., "Inactive," "not communicating," or 'N') in the look-up table for the deregistered device. If a deregistered device remains within the coverage area of an access point through which it may connect to the IMS network, the deregistered device simply repeats the registration process to re-establish access to the IMS network. In such case, the look-up table is then updated to again indicate a registered status for the device.

In another embodiment, the system performs periodic refreshes of one or more user devices in look-up table 200 in order to determine registration status. For example, the location/application server 140 may send a status request message (such as an Internet ping request) to each registered device at a predetermined, fixed or variable interval. If the queried device responds, then the registration status of the device remains active in the look-up table 200. If, however, a response is not received from the queried device, then the registration status is set to inactive in the look-up table 200. Although tracking registration and deregistration of devices is described with respect to the location/application server 140, a person of ordinary skill in the art will recognize that one or more additional components in the broadcast network 104 may carry out the tracking functionality (e.g., the CBC 130).

An "Alert Message" portion 225 of the table contains three columns that track the identity and status of multiple alert messages. A "Message ID" column 226 uniquely identifies each message received by the system on a per-device basis. The Message ID may be any value operable to distinguish one alert message from other alert messages in the look-up table. A "Message Sent" column 227 contains an indication of whether a particular alert (i.e., Message ID) has been sent to a particular device (i.e., device identifier) that lies within a determined target area, as described above. When the broadcast network 104 sends an alert message to a particular registered device, the system updates the corresponding entry in the look-up table 200, for example by indicating a 'Y' in column 227. In addition, a "Confirmation Received" column 228 contains an indication of whether the particular registered device returns an acknowledgement of the particular alert message. The system will assign a default value of 'N' in the "Confirmation Received" column 228 when the alert message is sent. If an acknowledgement is received, the system will update the look-table 200 to reflect a value of 'Y' in the "Confirmation Received" column 228.

A person of ordinary skill will appreciate that look-up table 200 may be used to track the identity and status of multiple alert messages on a per-UE or per-device identifier level. For example, look-up table 200 may be used to track the status of a first alert message (Message ID D5546) to reflect that the system has sent Alert Message D5546 to a first registered device (Device Identifier 548785463215465) but has not yet received a confirmation from the first registered device; the system has not sent the first Alert Message D5546 to a second registered device (Device Identifier 588745445189336) and accordingly has not yet received a confirmation from the second registered device; and so on.

Similarly, look-up table 200 may be used to track the status of a second alert message (Message ID BBTGD) to reflect that the system has sent Alert Message BBTGD to a first registered device (Device Identifier 548785463215465) but has not yet received a confirmation from the first registered device; the system has sent the second Alert Message BBTGD to a second registered device (Device Identifier 588745445189336) and has received a confirmation from the second registered device; the system has sent the second Alert Message BBTGD to a third registered device (Device Identifier GGFUHDS) and has received a confirmation from the third registered device; and so on.

A person of ordinary skill in the art will appreciate that look-up table 200 may omit any of the columns depicted in FIG. 2 and/or may add additional columns to track a variety of additional information, including but not limited to a time that a device is registered on the IMS network or a time that a device registration is refreshed on the IMS network (i.e., a registration time field), a time that a device registration fails to refresh on the IMS network, a time that a device is explicitly deregistered from the IMS network, a time that a message is sent, a time that a confirmation is received, and information regarding the nature and target area of the message.

Example Process/Call Flow

Figure 3:
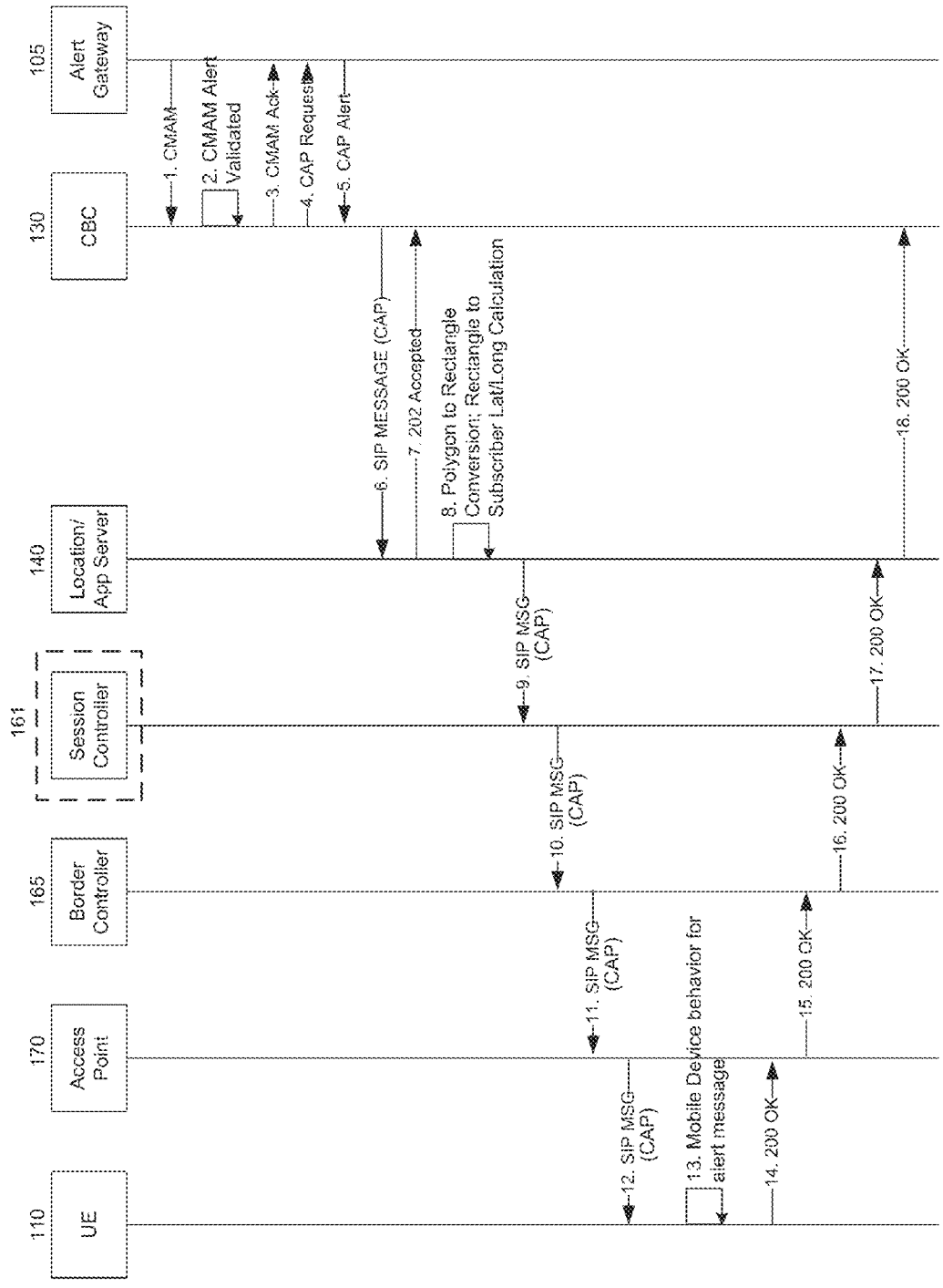
FIG. 3 is a flow diagram of a method for targeted broadcasting of alert messages.

FIG. 3 shows a flow diagram of a method for targeted broadcasting of alert messages, as described above. At step 1, the alert gateway 105 sends the CMAM to the CBC 130. The CBC 130 receives the CMAM from the alert gateway 105, including the geographic location information (hereinafter "GLI") of the target area 108. The CBC 130 validates the CMAM that is received from the alert gateway 105. If the CMAM is determined to be invalid, the CBC 130 may ignore the CMAM. Otherwise, if the CMAM is determined to be valid, processing continues at step 3. At step 3, the CBC 130 sends an acknowledgment to the alert gateway 105 notifying the alerting network 102 that a valid CMAM was received. At step 4, the CBC 130 sends a CAP request to the alert gateway 105. At step 5, the alert gateway 105 responds with a CAP alert.

At step 6, the CBC 130 transmits the GLI and queries the application/location server 140 to determine the access points 180 within the target area 108 to be used for target broadcasting. Alternatively or additionally, the CBC 130 queries the application/location server 140 to obtain the shape (e.g., geographic shape) that represents the target area 108 for target broadcasting. The representative shape may, for example, take a form of a polygon, square, rectangle, circle or any shape that sufficiently represents the target area 108, as noted above. Both the determination of the one or more access points 108 within the target area 108 and the representative shape are based on the received GLI. The GLI may, for example, be selected from a Geographic Names Information System (GNIS). The GNIS is a database that includes name and locative information regarding physical and cultural features located throughout the United States and its territories. The GNIS is part of a system that includes topographic map names and bibliographic references. Alternatively or additionally, the GLI of the target area 108 may be received in terms of a particular code, such as a FIPS code or ZIP code.

At step 7, the application/location server 140 sends an acceptance message to the CBC 130. At step 8, the application/location server 140 transforms the GLI (e.g., GNIS, FIPS code, ZIP code, or GPS coordinates) into the shape that represents the target area 108. The representative shape may be an approximate geographic representation that best estimates the target area 108. The application/location server 140 may have access to one or more processors operable to approximate the representative shape of the target area 108 based on the GLI. Alternatively, the GLI is received in terms of the representative shape (e.g., 5 mile radius having a center at a defined coordinate). Using the look-up table 200, the application/location server 140 identifies the access points and registered devices located within the target area, as described above.

The location/application server 140 then transmits the alert message through the IMS network to each registered device within the target area. For example, the location/application server 140 transmits the alert to one or more session controllers 161 (step 9). The one or more session controllers transmits the alert message to a border controller 165 (step 10). The border controller 165 transmits the alert message to access point 170 (step 11). The access point 170 then transmits the alert message to a registered device 110 (step 12).

At step 13, the registered device (e.g., a mobile device) performs behavior for an alert message. Such behavior may include providing an audible or visual alert on the mobile device in accordance with the content of the alert. For example, in the case of an AMBER Alert, the registered device may display an image of an abducted child, the alleged abductor, and information regarding the vehicle being driven by the alleged abductor. For an environmental emergency, the alert may provide instructions as to where to go (e.g. routes to take for a hurricane evacuation).

The registered device sends to the location/application server 140 an acknowledgement that the alert was received. At step 14, the registered device sends an acknowledge message to access point 170. At step 15, access point 170 sends the acknowledge message to border controller 165. At step 16, the border controller 165 sends the acknowledge message to the one or more session controllers 161. At step 17, the one or more session controllers 161 send the acknowledge message to the location/application server 140. At step 18, the location/application server 140 sends the acknowledge message to the CBC 130.

Figure 4:
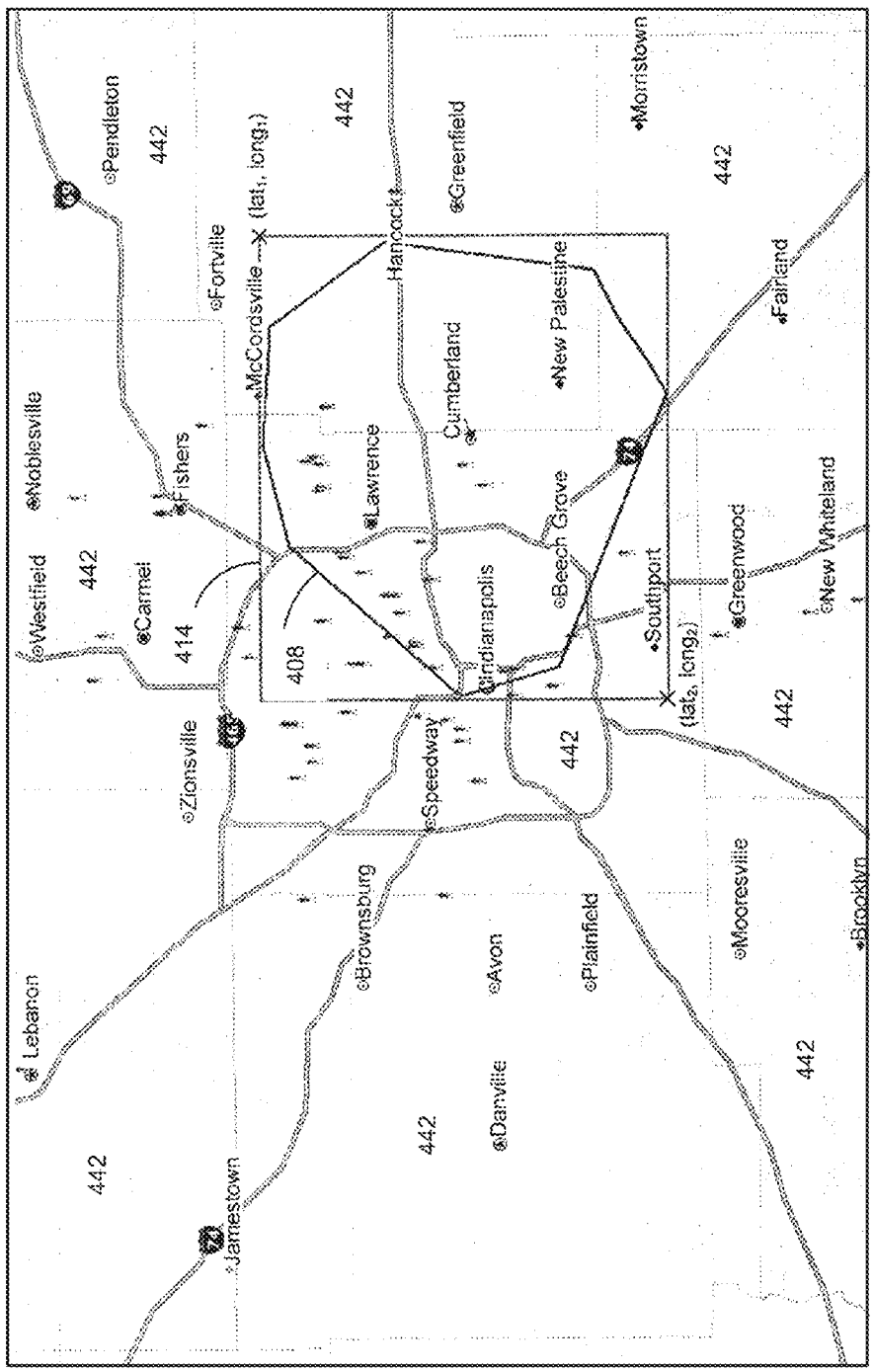
FIG. 4 is a geographic illustration of a target area covering portions of several counties having devices located throughout.

FIG. 4 shows a geographic illustration of several counties 442 having devices located throughout. As illustrated in FIG. 4, a target area 408 includes portions of three of these counties 442. In contrast, a representation of the target area 408 by FIPS code alone would define the target area 408 as encompassing the entire three counties 442, instead of only the select portions of these three counties 442. Such would unnecessarily alert device users outside of the intended target area 408.

For target broadcasting, the location/application server 140 accesses the lookup-table 200 in database 150 to identify access points located within the target area 408. The location/application server 140 may perform a point-in-polygon search, polygon-in-polygon search or similar search to identify the identifiers within the target area 408. The location/application server 140 creates a list of identifiers for access points located in the target area 408 for forwarding to the CBC.

Additionally or alternatively, the location/application server 140 calculates the adjusted target area 414 that substantially approximates the target area 408. The adjusted target area 414 approximation of the target area 408 allows for a two-point determination of the adjusted target area 414. For example, as illustrated in FIG. 4, two opposite points of the adjusted target area 414 may define a rectangular shape. The two points may comprise a first latitude/longitude coordinate (lat.sub.1, long.sub.1) and a second latitude/longitude coordinate (lat.sub.2, long.sub.2). The boundary of the adjusted target area 414 is thus readily defined by an area between the first and second latitudes, and between the first and second longitudes. The location/application server 140 determines these two opposite points (lat.sub.1, long.sub.1), (lat.sub.2, long.sub.2) for forwarding to the CBC 130. A person of ordinary skill in the art will appreciate that other methods for defining the adjusted target area 414 are within the scope of the invention described herein. For example, the adjusted target area 414 may be a circle defined by a center coordinate and a radius.

Upon determining the list of identifiers of the respective access points within the target area 408 and/or the two opposite points (lat.sub.1, long.sub.1), (lat.sub.2, long.sub.2) of the adjusted target area 414, the location/application server 140 forwards the list of identifiers of the respective access points in the target area 408 and/or the coordinates of the opposite points of the adjusted target area 414 to the CBC. The CBC 130 then transmits the alert to the registered devices in the target area 408 without substantially broadcasting outside the target area 408.

Conclusion

The discussion above has provided a brief, general description of a suitable environment in which aspects of the invention can be implemented. Although not required, aspects of the invention are described herein in the general context of computer-executable instructions, such as routines that may be executed by a general-purpose data processing device, e.g., a networked server computer, mobile device, etc. Those skilled in the relevant art will appreciate that aspects the invention can be practiced with other communications, data processing, or computer system configurations, including: Internet appliances, hand-held devices (including personal digital assistants (PDAs) and smartphones), wearable computers, all manner of corded, landline, fixed line, cordless, cellular or mobile phones, multi-processor systems, microprocessor-based or programmable consumer electronics, set-top boxes, network PCs, mini-computers, mainframe computers, media players, and the like. Indeed, the terms "computer," "server," and the like are generally used interchangeably herein, and refer to any of the above devices and systems, as well as any data processor.

While aspects of the invention, such as certain functions, are described as being performed exclusively or primarily on a single device, the invention can also be practiced in distributed environments where functions or modules are shared among disparate processing devices, which are linked through a communication network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of the invention may be distributed over the Internet or over other networks (including wireless networks), on a propagated signal on a propagation medium (e.g., an electromagnetic wave(s), a sound wave(s), etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while aspects of the invention are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A method to broadcast alert messages to IP Multimedia Subsystem (IMS)-enabled devices connected to wireless access points located in an alert target area, comprising:

maintaining a dataset of locations of known wireless access points and, for each access point, a device identifier and a session state of IMS-enabled devices that access the known wireless access point;

receiving an alert message, wherein the alert message includes a link to external data comprising geographic location information for an alert target area in which the alert message is to be broadcast;

retrieving, via the link to external data, the geographic location information for the alert target area in which the alert message is to be broadcast;

identifying one or more wireless access points located within the alert target area by comparing the locations of known wireless access points to the alert target area to identify wireless access points that fall within the alert target area;

for each identified wireless access point located within the alert target area:

using the dataset to identify one or more IMS-enabled devices that are indicated as having an active session with the identified wireless access point; and, for each determined IMS-enabled device indicated as having an active session, using the dataset to retrieve a device identifier associated with the IMS-enabled device; and sending the received alert message to each IMS-enabled device indicated as having an active session; and wherein the method further comprises one or more of the following (a), (b) or (c):

(a) maintaining in the dataset of locations of known wireless access points, for each alert message, a message identifier and an indication of whether the message has been sent to an IMS-enabled device associated with a device identifier, and updating the dataset, upon sending the received alert message, to indicate that the alert message has been sent; or (b) maintaining in the dataset of locations of known wireless access points, for each alert message, a message identifier and an indication of a message confirmation, the message confirmation corresponding to the receipt of the message by an IMS-enabled device to which the message was sent, and updating the dataset of locations of known wireless access points, upon receiving the message confirmation, to indicate that the alert message has been received by the IMS-enabled device to which the message was sent; or (c) maintaining in the dataset of locations of known wireless access points, for each device identifier, an indication of an amount of time that has elapsed since the device identifier was last registered on an IMS network, wherein the alert message is broadcast over an IMS network, and if the elapsed time is greater than or equal to a predetermined threshold, updating the session state to indicate that the device is inactive.

2. The method of claim 1, wherein the alert message is an AMBER Alert.

3. The method of claim 1, wherein the alert message is a Presidential Alert or an alert corresponding to a weather condition.

4. The method of claim 1, wherein the geographic location information for an alert target area is a shape selected from a circle or polygon.

5. The method of claim 1, wherein the geographic location information for an alert target area is a set of Geographic Positioning System (GPS) coordinates or Geographic Names Information System (GNIS) data.

6. The method of claim 1, wherein the geographic location information for an alert target area is a Zone Improvement Plan (ZIP) code or a Federal Information Processing Standards (FIPS) code.

7. The method of claim 1, wherein the IMS-enabled device is a mobile phone.

8. A tangible computer-readable medium, excluding transitory signals, and storing instructions that, when executed by a processor of an IP Multimedia Subsystem (IMS) network, cause the IMS network to perform a method for broadcast alert messages to IMS-enabled devices connected to wireless access points located in an alert target area, comprising:

maintaining a dataset of locations of known wireless access points and, for each access point, a device identifier and a session state of IMS-enabled devices that access the known wireless access point;

receiving an alert message to be broadcast to an alert target area, wherein the alert message includes a link to external data comprising geographic location information for the alert target area in which the alert message is to be broadcast;

retrieving, via the link to external data, the geographic location information for the alert target area in which the alert message is to be broadcast;

identifying one or more wireless access points located within the alert target area by comparing the locations of known wireless access points to the alert target area to identify wireless access points that fall within the alert target area;

for each identified wireless access point located within the alert target area:

using the dataset to identify one or more IMS-enabled devices that are indicated as being in communication with the identified wireless access point; and, for each determined IMS-enabled device indicated as being in communication with the identified wireless access point, using the dataset to retrieve a device identifier associated with the IMS-enabled device; and sending the received alert message to each IMS-enabled device indicated as being in communication with the identified wireless access point; and wherein the method further comprises one or more of the following (a), (b) or (c):

(a) maintaining in the dataset of locations of known wireless access points, for each alert message, a message identifier and an indication of whether the message has been sent to an IMS-enabled device associated with a device identifier, and updating the dataset, upon sending the received alert message, to indicate that the alert message has been sent; or (b) maintaining in the dataset of locations of known wireless access points, for each alert message, a message identifier and an indication of a message confirmation, the message confirmation corresponding to the receipt of the message by an IMS-enabled device to which the message was sent, and updating the dataset of locations of known wireless access points, upon receiving the message confirmation, to indicate that the alert message has been received by the IMS-enabled device to which the message was sent; or (c) maintaining in the dataset of locations of known wireless access points, for each device identifier, an indication of an amount of time that has elapsed since the device identifier was last registered on an IMS network, wherein the alert message is broadcast over an IMS network, and if the elapsed time is greater than or equal to a predetermined threshold, updating the session state to indicate that the device is inactive.

9. The tangible computer-readable medium of claim 8, wherein the alert message is an AMBER Alert.

10. The tangible computer-readable medium of claim 8, wherein the alert message is a Presidential Alert or an alert corresponding to weather condition.

11. The tangible computer-readable medium of claim 8, wherein the geographic location information for the alert target area is a set of GPS coordinates.

12. The tangible computer-readable medium of claim 8, wherein the geographic location information for the alert target area is Geographic Names Information System (GNIS) data, a Zone Improvement Plan (ZIP) code, or a Federal Information Processing Standards (FIPS) code.

13. The tangible computer-readable medium of claim 8, wherein the instructions further cause the IMS network to convert the received geographic location information for the alert target area from a first type to a second type.

14. The tangible computer-readable medium of claim 8, wherein the IMS-enabled device is a mobile phone.

15. An IP Multimedia Subsystem (IMS) network apparatus for assisting in the broadcast of alert messages to IMS-enabled devices connected to wireless access points located in an alert target area, comprising:

at least one processor;

at least memory, coupled to the processor, and storing instructions for performing a method comprising:

maintaining a dataset of locations of known wireless access points and, for each access point, a device identifier and a session state of IMS-enabled devices that access the known wireless access point;

receiving an alert message to be broadcast to an alert target area, wherein the alert message includes a link to external data comprising geographic location information for the alert target area in which the alert message is to be broadcast;

retrieving, via the link to external data, the geographic location information for the alert target area in which the alert message is to be broadcast;

identifying one or more wireless access points located within the alert target area by comparing the locations of known wireless access points to the alert target area to identify wireless access points that fall within the alert target area;

for each identified wireless access point located within the alert target area:
  using the dataset to identify one or more IMS-enabled devices that are indicated as being in communication with the identified wireless access point; and,
  for each determined IMS-enabled device indicated as being in communication with the identified wireless access point, using the dataset to retrieve a device identifier associated with the IMS-enabled device; and
sending the received alert message to each IMS-enabled device indicated as being in communication with the identified wireless access point.

16. The apparatus of claim 15, wherein the method further comprises one or more of the following (a), (b) or (c):
  (a) maintaining in the dataset of locations of known wireless access points, for each alert message, a message identifier and an indication of whether the message has been sent to an IMS-enabled device associated with a device identifier, and
    updating the dataset, upon sending the received alert message, to indicate that the alert message has been sent; or
  (b) maintaining in the dataset of locations of known wireless access points, for each alert message, a message identifier and an indication of a message confirmation, the message confirmation corresponding to the receipt of the message by an IMS-enabled device to which the message was sent, and
    updating the dataset of locations of known wireless access points, upon receiving the message confirmation, to indicate that the alert message has been received by the IMS-enabled device to which the message was sent; or
  (c) maintaining in the dataset of locations of known wireless access points, for each device identifier, an indication of an amount of time that has elapsed since the device identifier was last registered on an IMS network, wherein the alert message is broadcast over an IMS network, and
    if the elapsed time is greater than or equal to a predetermined threshold, updating the session state to indicate that the device is inactive.

17. The apparatus of claim 15, wherein the alert message is an AMBER alert.

18. The apparatus of claim 15, wherein the alert message is a Presidential Alert or an alert corresponding to a weather condition.

19. The apparatus of claim 15, wherein the geographic location information for the alert target area is a set of GPS coordinates.

20. The method of claim 15, wherein the geographic location information for the alert target area is Geographic Names Information System (GNIS) data, a Zone Improvement Plan (ZIP) code, or a Federal Information Processing Standards (FIPS) code.

* * * * *